（12) United States Patent
Kobayashi

(10) Patent No.: US 6,654,327 B2
(45) Date of Patent: Nov. 25, 2003

(54) OPTICAL DISK APPARATUS, METHOD OF RECORDING ON OPTICAL DISK, AND OPTICAL DISK

(75) Inventor: Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 09/870,822

(22) Filed: Jun. 1, 2001

(65) Prior Publication Data

US 2002/0015369 A1 Feb. 7, 2002

(30) Foreign Application Priority Data

Jun. 1, 2000 (JP) ........................................ 2000-169059

(51) Int. Cl.$^7$ ................................................ G11B 7/00
(52) U.S. Cl. ................ 369/53.21; 369/53.1; 369/47.12; 369/275.1
(58) Field of Search .................... 369/47.1, 47.12, 369/47.13, 47.55, 53.1, 53.2, 53.21, 53.44, 83, 84, 59.1, 275.1, 275.5

(56) References Cited

U.S. PATENT DOCUMENTS

| 5,400,319 A | | 3/1995 | Fite et al. |
| 5,818,812 A | * | 10/1998 | Moribe et al. ........... 369/47.15 |
| 5,881,038 A | * | 3/1999 | Oshima et al. .......... 369/47.12 |

* cited by examiner

*Primary Examiner*—Muhammad Edun
(74) *Attorney, Agent, or Firm*—Oblon, Spivak, McClelland, Maier & Neustadt, P.C.

(57) ABSTRACT

An optical disk apparatus includes a recording unit for recording information regarding copyright by irradiating an optical disk with laser beams; and a controlling unit for controlling the recording unit so that, after the information regarding copyright has been recorded in a predetermined area on the optical disk, the level of recording of the information regarding copyright is deteriorated by irradiating the predetermined area with the laser beams, for example, by recording predetermined information overlapping the recording of the information regarding copyright.

18 Claims, 7 Drawing Sheets

OPTICAL DISK APPARATUS, METHOD OF RECORDING ON OPTICAL DISK, AND OPTICAL DISK

BACKGROUND OF THE INVENTION

1. Field of the Invention

The present invention relates to an optical disk apparatus, a method of recording on an optical disk, and an optical disk, and may be applied, for example, to a minidisk (MD), a compact disk (CD), a digital video disk (DVD), etc., and recording and playback apparatuses therefor. More specifically, according to the present invention, after information regarding copyright is recorded, the level of recording of the information regarding copyright is deteriorated, for example, by an overlapped recording, so that the benefits of the copyright holder are protected more effectively compared with before.

2. Description of the Related Art

Minidisk apparatuses, which are a type of optical disk apparatuses, have been rapidly spreading in recent years because they readily allow copying of various contents of music while not degrading the quality of sound. More specifically, the minidisk apparatuses allow music information distributed via the Internet to be recorded on minidisks for audition, and also allow music on a compact disk borrowed from a friend, etc. to be recorded on a minidisk for audition. Furthermore, music can also be copied from minidisk to minidisk.

Although the easy copying of music, with the sound quality maintained, provides considerable advantages to the user, the benefits of the copyright holder who has created the music may be impoverished. Thus, in organizations and forums such as RIAA (Recording Industry Association of America), SDMI (Secure Digital Music Initiative), CPTWG (Copy Protection Technical Working Group), various approaches have been considered aiming at protection of the benefits of the copyright holder.

As one of the approaches, a method has been proposed in which music information is recorded while being encrypted using copyright protection information which is unique to each storage medium. According to this method, if the music information is copied to another storage medium, decryption is inhibited because the copyright protection information differs from storage medium to storage medium. Accordingly, unrestricted copying of the music information is prevented, thereby protecting the benefits of the copyright holder.

As methods of recording the copyright protection information, for example, a method in which a sector inhibited from user access is provided and the copyright protection information is recorded in the sector, and a method in which a reflection film is partially removed from recording of primary data in the form of a pit sequence so that the copyright protection information is recorded in the form of bar codes (International Publication No. WO97/14144), have been proposed.

These methods, however, are not still practically sufficient to effectively protect the benefits of the copyright holder.

More specifically, in accordance with the method in which the copyright protection information is recorded in the sector inhibited from user access, while the copyright protection information can be recorded relatively easily, the copyright protection information is rather susceptible to copying.

In accordance with the method in which the copyright protection information is recorded in the form of bar codes by partially removing the reflection film, recording of the copyright protection information can be visually checked by observations using a microscope, etc., for the purpose of copying. Thus, so-called pirated editions cannot be fully prevented. Instead of removing the reflection film, in another method, an opaque film may be partially formed on the surface of an optical disk, the copyright protection information being recorded in a similar manner. However, this method also suffers the similar problem as in the method in which the reflection film is partially removed.

SUMMARY OF THE INVENTION

The present invention has been made in view of the above, and an object thereof is to provide an optical disk apparatus, a method of recording on an optical disk, and an optical disk which serve to protect the benefits of the copyright holder more effectively compared with before.

To this end, according to a first aspect of the present invention, an optical disk apparatus is provided. The optical disk apparatus includes a recording unit for recording information regarding copyright by irradiating an optical disk with laser beams; and a controlling unit for controlling the recording unit so that, after the information regarding copyright has been recorded in a predetermined area on the optical disk, the level of recording of the information regarding copyright is deteriorated by irradiating the predetermined area with the laser beams.

According to a second aspect of the present invention, a method of recording information regarding copyright by irradiating an optical disk with laser beams is provided. The method includes the steps of recording the information regarding copyright in a predetermined area of the optical disk, and deteriorating the level of recording of the information regarding copyright by irradiating the predetermined area with laser beams.

According to a third aspect of the present invention, an optical disk apparatus which irradiates an optical disk with laser beams so as to play back data recorded on said optical disk is provided. The optical disk apparatus includes a playback signal output unit for outputting, by irradiating the optical disk with the laser beams and detecting light returning therefrom, a playback signal whose signal level changes according to mark sequences formed on the optical disk; a pattern determination unit for determining a pattern of the mark sequences formed on the optical disk; a decoding unit for eliminating variations of the signal level of the playback signal due to the mark sequences based on a determination result of the pattern determination unit and determining the signal level, and for playing back information regarding copyright recorded on the optical disk; and a controlling unit for controlling access to the optical disk using the information regarding copyright.

According to a fourth aspect of the present invention, an optical disk including an information recording surface is provided. In the optical disk, information regarding copyright is recorded in a predetermined area of the information recording surface, and the level of recording of the information regarding copyright is deteriorated by irradiating the predetermined area with laser beams.

According to the first and the second aspects, after the information regarding copyright is recorded in the predetermined area of the optical disk, the predetermined area is irradiated with laser beams, deteriorating the level of recording of the information regarding copyright. Thus, the information regarding copyright is inhibited from playback and detection. Accordingly, the benefits of the copyright holder can be protected more effectively compared with before.

According to the third aspect, the signal level is determined while eliminating the variations of the signal level of the playback signal due to the mark sequences, the information regarding copyright, recorded on the optical disk, is played back, and access to the optical disk is controlled using the information regarding copyright. Thus, even if, after the information regarding copyright is recorded in the predetermined area of the optical disk, the level of recording of the information regarding copyright is deteriorated by irradiating the predetermined area with laser beams, the information regarding copyright, recorded on the optical disk, is allowed to be played back.

According to the fourth aspect, after the information regarding copyright is recorded in the predetermined area of the optical disk by irradiation of laser beams, the level of recording of the information regarding copyright is deteriorated by irradiating the predetermined area with laser beams. Accordingly, the optical disk serves to protect the benefits of the copyright holder effectively.

In all, according to the present invention, after the information regarding copyright is recorded, the level of recording of the information regarding copyright is deteriorated, for example, by an overlapped recording. Accordingly, the benefits of the copyright holder can be protected more effectively compared with before.

DESCRIPTION OF THE PREFERRED EMBODIMENTS

Figure 1:
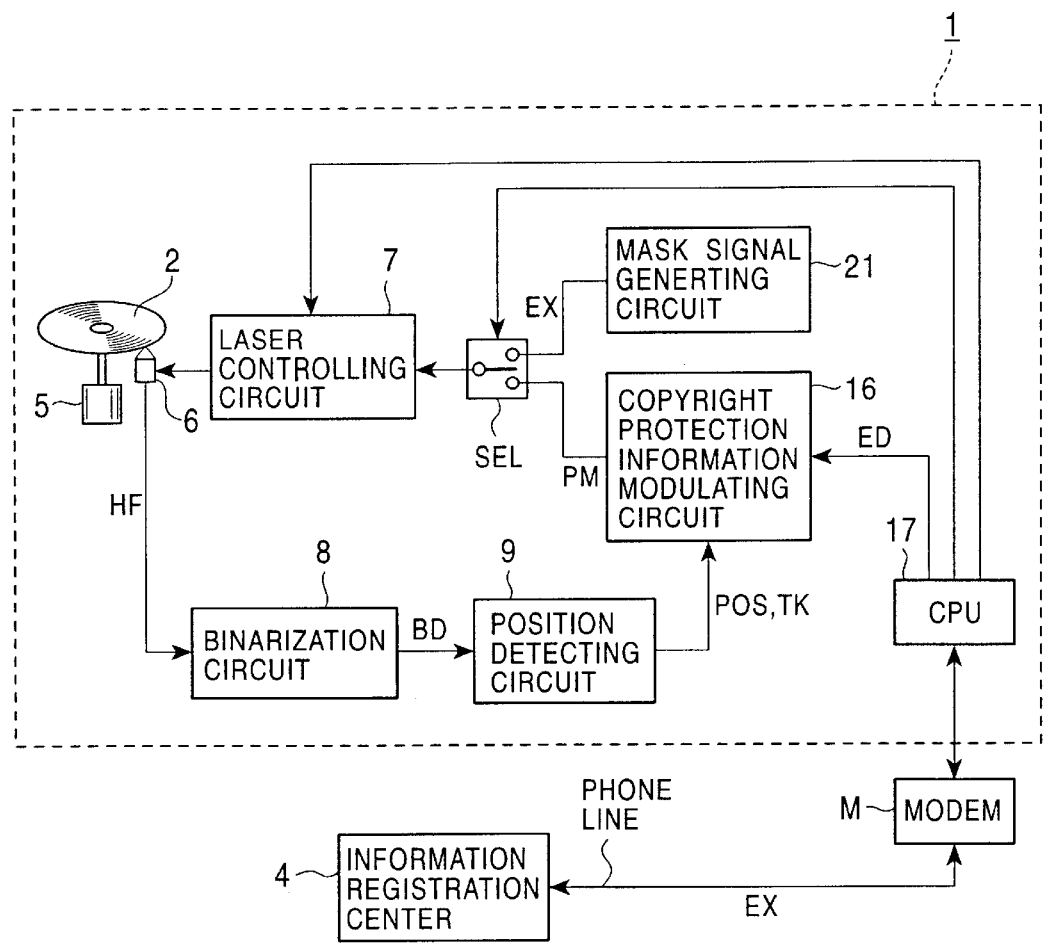
FIG. 1 is a block diagram of a copyright information recording apparatus according to an embodiment of the present invention.

An embodiment of the present invention will be described below with reference to the drawings.
(1) Construction of the Embodiment FIG. 1 is a block diagram of a copyright information recording apparatus according to the embodiment of the present invention. In the manufacturing process of an optical disk according to the embodiment, the copyright information recording apparatus 1 records copyright protection information ED on the optical disk 2 before shipment thereof.

The copyright protection information ED concerns protection of copyright, and it is uniquely assigned to each optical disk. In the case o the optical disk 2, the copyright protection information ED includes, for example, ID information unique to the optical disk 2, information relating to the manufacturing factory, the date of production, and information for controlling permission of copying. The copyright information recording apparatus 1 accesses as required, for example, via the phone line, to an information registration center 4 which manages copyright protection information, thereby obtaining the copyright protection information ED.

Figure 2:
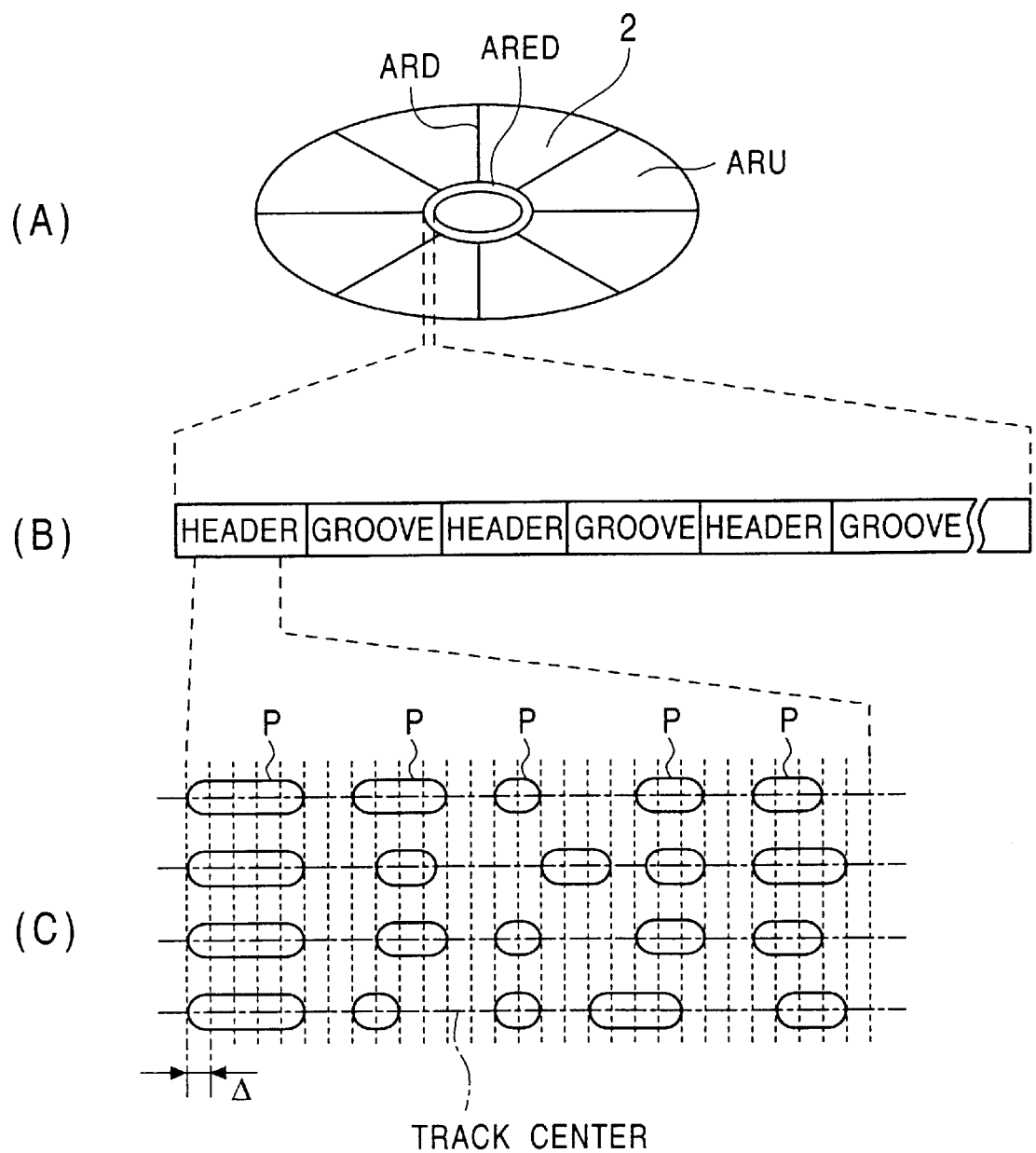
FIG. 2 is a schematic diagram of an optical disk on which copyright protection information is recorded by the copyright information recording apparatus shown in FIG. 1.

The optical disk 2 is a rewritable optical disk, and in this embodiment, it is an optical disk of the phase-change type. The optical disk 2 employs the CAV (Constant Angular Velocity) or ZCLV (Zone Constant Linear Velocity) format. FIG. 2 shows an example in which the optical disk 2 employs CAV. Referring to FIG. 2, in the optical disk 2, as shown in (A), a predetermined area on the inner side is allocated as a copyright protection information recording area ARED, address areas ARD are radially formed in the remaining area on the outer side, and the areas between adjacent address areas ARD serve as user data recording areas ARU.

In the copyright protection information recording area ARED, tracks including a repetition of pit sequences and grooves for guiding laser beams, as shown in (B), are formed spirally extending from the inner side to the outer side. In the copyright protection information recording area ARED, substantially, one pit sequence is formed on each of the tracks on the optical disk 2, the pit sequence serving as a header. The header includes a header pattern indicating the start of the header, a track address identifying the track number, etc.

In the address areas ARD and the user data recording areas ARU, respectively, pit sequences and grooves are formed on tracks, the tracks being spirally continued from the tracks in the copyright protection information recording area ARED. The optical disk 2 is manufactured by forming the pit sequences and the grooves on a disk substrate, forming a phase-change film, and then forming a protective film, etc. The optical disk 2 thus allows tracking control with reference to the grooves, and recording of audio data, etc. in the user data recording areas ARU with reference to the pit sequences indicating addresses.

With regard to the pit sequences thus formed, as shown in (C), pits P and spaces therebetween are provided each corresponding to a period which is an integer multiple of a period corresponding to the rotation of the optical disk 2 by the minute rotation angle Δ.

Turning back to FIG. 1, a spindle motor 5, under the control of a servo circuit which is not shown, rotates the optical disk 2 at a predetermined rotation rate with reference to a channel clock obtained from the optical disk 2.

An optical pickup 6 irradiates the optical disk 2 with laser beams and detects light returning therefrom. In accordance therewith, the optical pickup 6 generates a playback signal HF whose signal level changes according to the pit sequences formed on the optical disk 2, a tracking error signal whose signal level changes according to the amount of tracking error, and a focus error signal whose signal level changes according to the amount of focus error. The optical pickup 6 performs tracking control and focus control under the control of the servo circuit, based on the tracking error signal and the focus error signal.

The optical pickup 6 raises the intensity of laser beams at a predetermined timing under the control of a laser controlling circuit 7, thereby recording the copyright protection information ED on the optical disk 2 in the form of mark sequences, and also recording a mask signal EX.

A binarization circuit 8 binarizes the playback signal HF with reference to predetermined slicing levels, thereby generating a binary signal BD.

Figure 3:
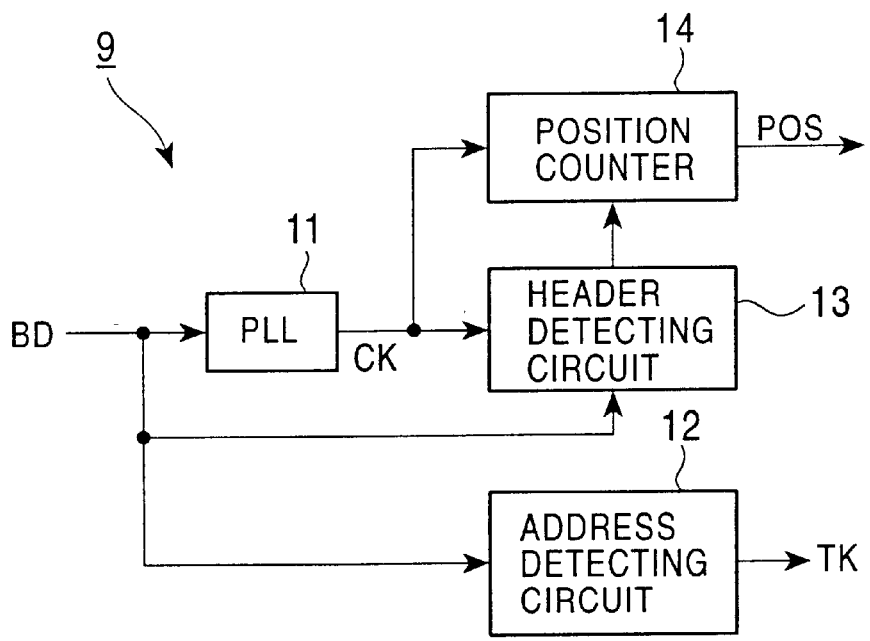
FIG. 3 is a block diagram of a position detecting circuit in the copyright information recording apparatus shown in FIG. 1.

A position detecting circuit 9 generates, according to the binary signal BD, position information POS and TK which indicate the positions on the optical disk 2 to be irradiated with laser beams. More specifically, as shown in FIG. 3, in the position detecting circuit 9, a PLL circuit 11 generates, with reference to the binary signal BD, a channel clock CK at a cycle corresponding to rotation of the optical disk 2 by the minute rotation angle Δ which serves as a reference for forming the pits P.

An address detecting circuit 12 sequentially determines the logic level of the binary signal BD with reference to the channel clock CK, thereby detecting a track address TK which is written in each header.

Similarly, a header detecting circuit 13 sequentially determines the logic level of the binary signal BD with reference to the channel clock CK, thereby detecting a header pattern indicating the start of each header. The timing of the detection is notified to a position counter 14.

The position counter 14 resets the counter value at the timing of the detection of each header pattern, notified from the header detecting circuit 13, and then sequentially counts the channel clock CK. The position counter 14 outputs the counter value as rotation angle information POS. In this embodiment, the copyright protection information recording area ARED includes headers which appear substantially by one on each track of the optical disk 2, and the minute rotation angle Δ is $4.8 \times 10^{-4°}$, whereby the position counter 14 outputs the rotation angle information POS which changes from 0 to approximately 754,000.

The position detecting circuit 9 detects, according to the track address TK and the rotation angle information POS, the positions to be irradiated with laser beams with respect the radial direction and the circumferential direction of the optical disk 2.

The copyright protection information modulating circuit 16 modulates the copyright protection information ED output from a central processing unit (CPU) 17, according to the position information TK and POS output from the position detecting circuit 9, thereby outputting a modulated signal PM. The copyright protection information ED is fed from the central processing unit 17 in the form of serial data, at a sufficiently slower transmission rate compared with the channel clock CK, so that each bit of the serial data corresponds to a variation on the order of 1 mm or longer with regard to the positions on the optical disk 2 to be irradiated with laser beams.

Figure 4:
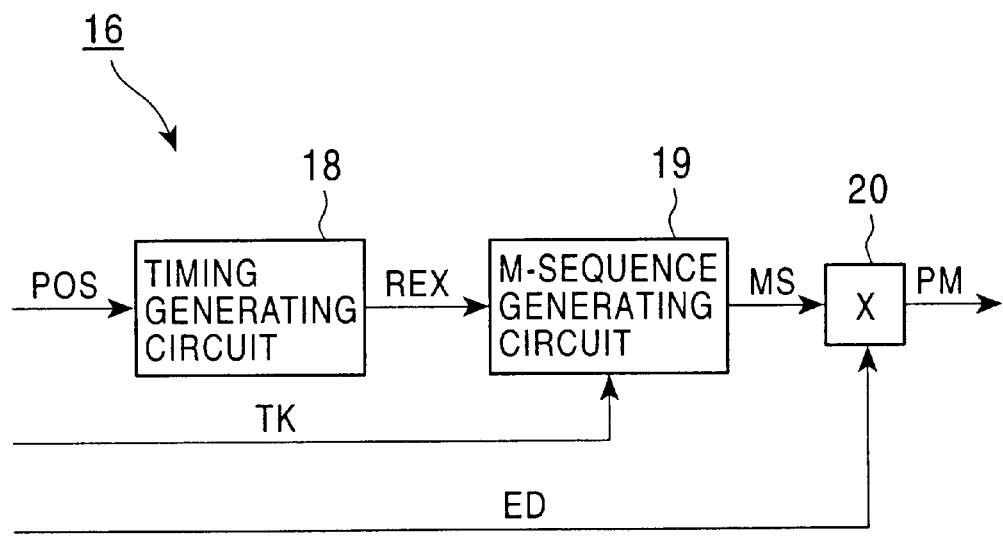
FIG. 4 is a block diagram of a copyright protection information modulating circuit in the copyright information recording apparatus shown in FIG. 1.

More specifically, as shown in FIG. 4, in the copyright protection information modulating circuit 16, when it is found based on the rotation angle information POS that the irradiation of laser beams has reached a predetermined position, a timing generating circuit 18 outputs a reset signal REX which initializes an M-sequence generating circuit 19.

The M-sequence generating circuit 19, when reset in response to the reset signal REX, outputs a pseudo-random number signal in synchronization with the channel clock CK. In this embodiment, the M-sequence generating circuit 19 generates an M-sequence MS, in which logic "1" and logic "0" appear with the same probability. The M-sequence generating circuit 19 is implemented, for example, by a combination of a plurality of flip-flops connected in series and a plurality of exclusive-OR circuits, wherein different M-sequences MS can be generated depending on the track address TK, for example, by switching preset values of the flip-flops depending on the track address TK.

An exclusive-OR circuit 20 takes the exclusive-OR of the copyright protection information ED and the M-sequence MS. The exclusive-OR circuit 20 outputs the value of the M-sequence MS when the copyright protection information ED is logic "0" while outputting the inverse of the value of the M-sequence MS when the copyright protection information ED is logic "1".

Thus, the copyright protection information modulating circuit 16 generates the modulated signal PM by scrambling the copyright protection information ED so that logic "1" and logic "0" will appear with a substantially equal probability. The spectrum of the modulated signal PM spreads over a wide frequency range; meanwhile, playback signals of optical disks generally exhibit low-frequency fluctuation. Thus, when the modulated signal PM is recorded on the optical disk 2, the effect of the low-frequency fluctuation is reduced, allowing accurate playback of the copyright protection information ED. Furthermore, at the time of playback, the modulated signal PM is detected as spreading over a wide frequency range similarly to a noise, and is observed as a noise when observed using an oscilloscope, thus inhibiting detection of the copyright protection information ED and therefore creation of pirate editions.

A mask signal generating circuit 21 generates a mask signal EX to be recorded overlappingly so as to mask the copyright protection information ED recorded on the optical disk 2. The mask signal generating circuit 21 generates the mask signal EX by 1-7 modulation, EFM modulation, or other types of modulation of predetermined information.

A selector SEL selectively outputs, under the control of the central processing unit 17, the modulated signal PM output from the copyright protection information modulating circuit 16 or the mask signal EX.

The laser controlling circuit 7, according to the output signal from the selector SEL, raises the intensity of the laser beams output from the optical pickup 6 from an intensity level for playback to a predetermined intensity level for recording, thereby recording the modulated signal PM and the mask signal EX. The laser controlling circuit 7 changes the intensity level for recording under the control of the central processing unit 17, thereby varying the length of the marks formed on the optical disk 2.

The central processing unit 17 constitutes a controller for controlling the operation of the copyright information recording apparatus 1, driving the modem M at a predetermined timing to access the information registration center 4 and thereby obtaining the copyright protection information ED. When the optical disk 2 is mounted, the central processing unit 17 makes the optical pickup 6 seek the lead-in area of the optical disk 2 by the control of a sled mechanism which is not shown, starting an access to the optical disk 2.

Figure 5A:
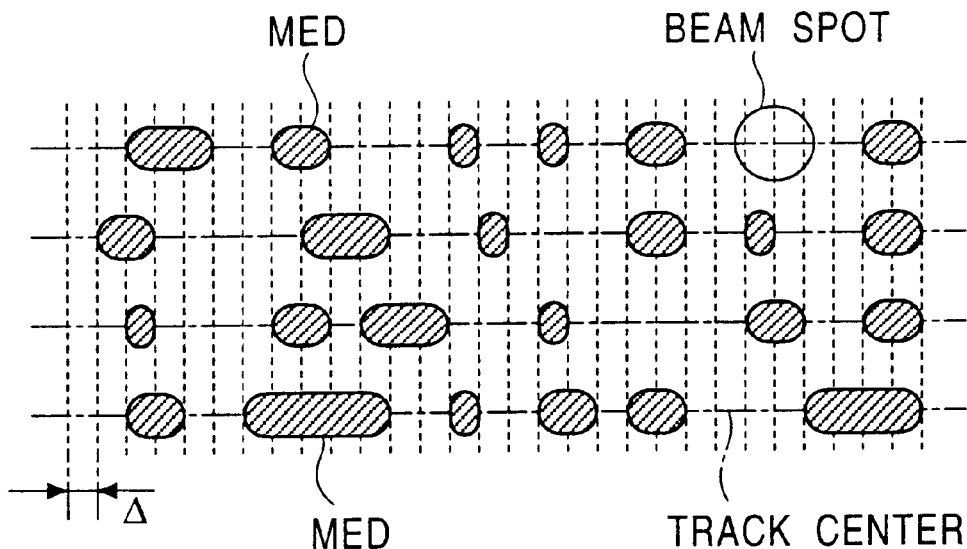
FIGS. 5A and 5B are plan views for explaining an overlapped recording by the copyright information recording apparatus shown in FIG. 1.

The central processing unit 17 thus starts access to the optical disk 2, and when the track address TK reaches a predetermined value, it switches the selector SEL to the side of the modulated signal PM and starts supplying the copyright protection information ED to the copyright protection information modulating circuit 16, thereby recording the copyright protection information ED in the copyright protection information recording area ARED. More specifically, as shown in FIG. 5A, the central processing unit 17, in accordance with scanning on beam spots by laser beams, sequentially forms marks MED and spaces therebetween on the optical disk 2 according to the modulated signal PM, thereby recording the copyright protection information ED.

Figure 5B:
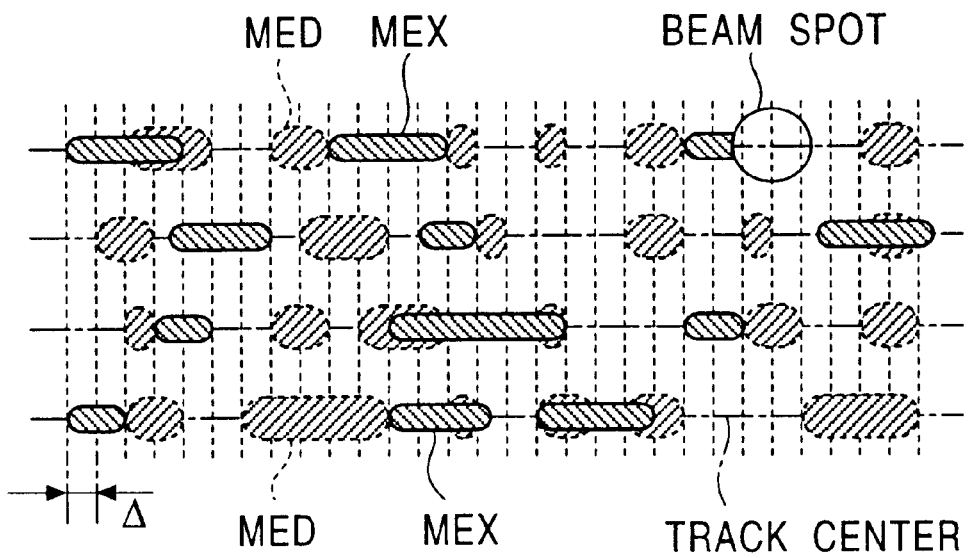

When the copyright protection information ED has been recorded, the central processing unit 17 makes the optical pickup 6 seek the lead-in area of the optical disk 2 again by the control of the sled mechanism, and when the track address TK reaches the start address of the recording of the copyright protection information ED, it switches the selector SEL to the side of the mask signal EX, recording the marks MEX and spaces therebetween, according to the mask signal EX, overlapping the copyright protection information recording area ARED where the copyright protection information ED has been recorded, as shown in FIG. 5B.

By the control of the laser controlling circuit 7, the central processing unit 17 records the mask signal EX overlapping the copyright protection information ED at an intensity level of laser beams lower than that for the recording of the copyright protection information ED. The central processing unit 17 thus covers the copyright protection information ED recorded on the optical disk 2 with the mask signal EX so that the level of recording of the copyright protection information ED is deteriorated, thereby inhibiting detection of the copyright protection information ED by a playback in an ordinary optical disk apparatus and therefore inhibiting creation of pirate editions.

More specifically, when the mask signal EX is recorded overlapping the copyright protection information ED as described above, typically, the copyright protection information ED will be played back not in its original form, but it is played back, in a common optical disk of the phase-change type, with a reduction in the signal level on the order of 30 dB compared to a case without the overlapped recording of the mask signal EX. Because the intensity of laser beams is reduced for the recording of the mask signal EX, the reduction of signal level is less than the above typical example.

Figure 6:
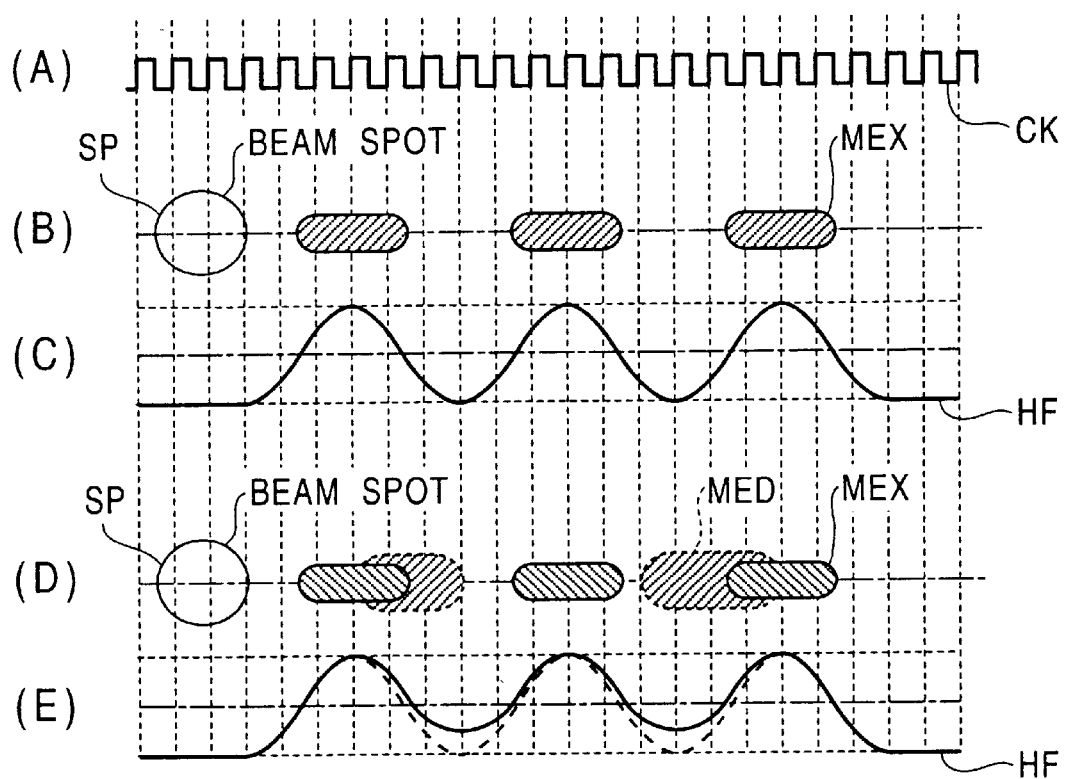
FIG. 6 is a schematic diagram showing a relationship between the overlapped recording shown in FIG. 5 and a playback signal.

The mask signal EX overlappingly recorded is played back with an effect of the copyright protection information ED. FIG. 6 is a signal waveform chart which serves to explain the effect. Referring to FIG. 6, with reference to the channel clock CK shown in (A), if only the marks MEX and spaces according to the mask signal EX are formed, the signal level of the playback signal HF obtained by a scanning in accordance with the beam spots SP changes according to the marks MEX, as shown in (B) and (C).

In contrast, if the mask signal EX is recorded over the tracks on which the marks MED and spaces according to the copyright protection information ED are already formed, the signal level of the playback signal HF changes due to the effect of the copyright protection information ED, as shown in (D) and (E). In (E), the signal waveform in the case where the marks MED and spaces according to the copyright protection information ED are not formed under the mask signal EX is shown by a dotted line.

Thus, this embodiment inhibits detection of the copyright protection information ED by the overlapped recording of the mask signal EX, and also inhibits detection of the copyright protection information ED by scrambling the playback signal of the copyright protection information ED using the mask signal EX.

Figure 7:
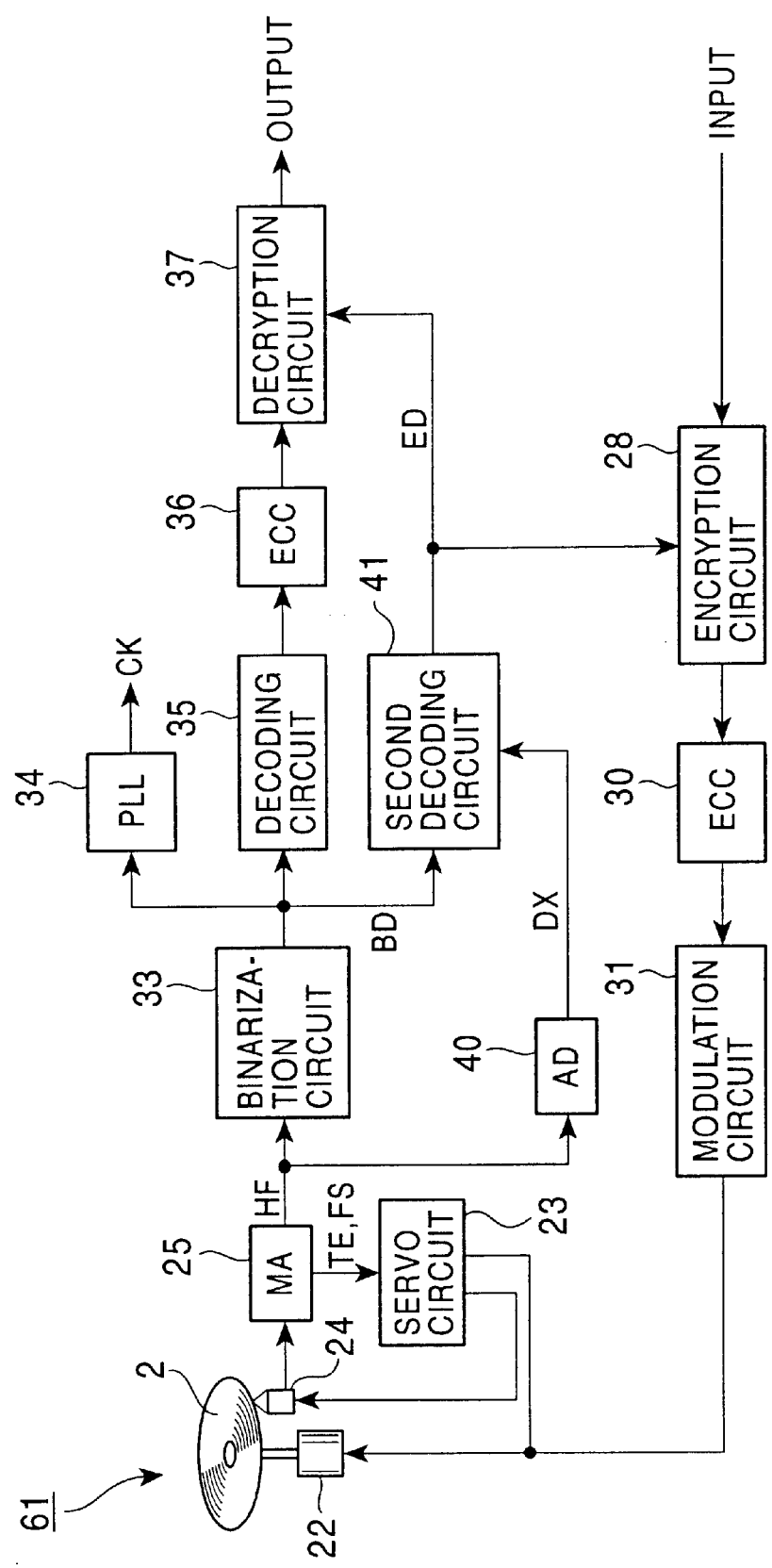
FIG. 7 is a block diagram of an optical disk apparatus compatible with an optical disk on which the copyright protection information is recorded by the copyright information recording apparatus shown in FIG. 1.

FIG. 7 is a block diagram of an optical disk apparatus 61 for use by ordinary users, which allows playback and recording of audio data, etc. on the optical disk 2 on which the copyright protection information ED is recorded as described above.

More specifically, in the optical disk apparatus 61, a spindle motor 22, under the control of a servo circuit 23, rotates the optical disk 2 at a predetermined rotation rate.

An optical pickup 24 is held by a predetermined sled mechanism so as to be movable in the radial direction of the optical disk 2. The optical pickup 24 irradiates the optical disk 2 with laser beams, and detects light returning therefrom. At the time of recording, the optical pickup 24 intermittently raises the intensity level of laser beams from an intensity level for playback to an intensity level for recording, thereby recording various information on the optical disk 2.

A matrix amp (MA) 25 processes the output signal from the optical pickup 24, thereby generating a tracking error signal TE whose signal level changes according to the amount of tracking error, a focus error signal FS whose signal level changes according to the amount of focus error, and a playback signal HF whose signal level changes according to pit sequences and mark sequences formed on the optical disk 2.

The servo circuit 23 performs tracking control and focus control for the optical pickup 24 based on the tracking error signal TE and the focus error signal FS. The servo circuit 23 also controls the rotation rate of the spindle motor 22 so that a clock generated from the playback signal HF will be of a predetermined frequency. Furthermore, the servo circuit 23 obtains a track address from the playback signal HF, and makes the optical pickup 24 seek a corresponding position according to the track address. Thus, in the optical disk apparatus 61, a controller which is not shown makes the optical pickup 24 seek in accordance with operations by the user, and controls the operation of the recording and playback systems, thereby allowing recording of audio data, etc. on the optical disk 2 and playback of the audio data, etc. recorded on the optical disk 2.

More specifically, in the recording system, an encryption circuit 28 receives from the controller, which is not shown, copyright protection information ED played back by a second decoding circuit 41, and sequentially encrypts input data using the copyright protection information ED. An error correction circuit (ECC) 30 adds error correcting codes to the output data from the encryption circuit 28. A subsequent modulation circuit 31 EFM (Eight to Fourteen Modulation)-modulates the output data from the error correction circuit 30 to generate a modulated signal, and intermittently raises the intensity level of the laser beams irradiated from the optical pickup 24 according to the modulated signal. Thus, the optical disk apparatus 61 records audio data, etc. with an encryption processing using the copyright protection information ED, which is unique to the optical disk 2.

Meanwhile, in the playback system, a binarization circuit 33 compares the playback signal HF against predetermined slicing levels, thereby binarizing the playback signal HF to generate a binary signal BD. A PLL circuit 34 operates with reference to the binary signal BD, thereby playing back the channel clock CK with reference to the pit sequences formed on the optical disk 2.

A decoding circuit 35 sequentially latches the binary signal BD with reference to the channel clock CK, thereby determining the binary level of the playback signal HF to generate playback data. Furthermore, the decoding circuit 35 executes a decoding process corresponding to the modulation at the time of recording, thereby outputting decoded data.

An error correction circuit (ECC) 36 corrects errors in the output data from the decoding circuit 35. The errors may be generated, for example, due to defects on the optical disk 2, etc. A decryption circuit 37 decrypts the playback data based on the copyright protection information ED. Thus, the optical disk apparatus 61 plays back audio data, etc. with a decryption processing using the copyright protection information ED, which is unique to the optical disk 2.

An analog-digital conversion circuit (AD) 40 sequentially converts the analog playback signal HF into an eight-bit digital playback signal DX with reference to the channel clock CK.

A second decoding circuit 41 processes the digital playback signal DX obtained from the copyright protection information recording area ARED, thereby decoding the copyright protection information ED.

Figure 8:
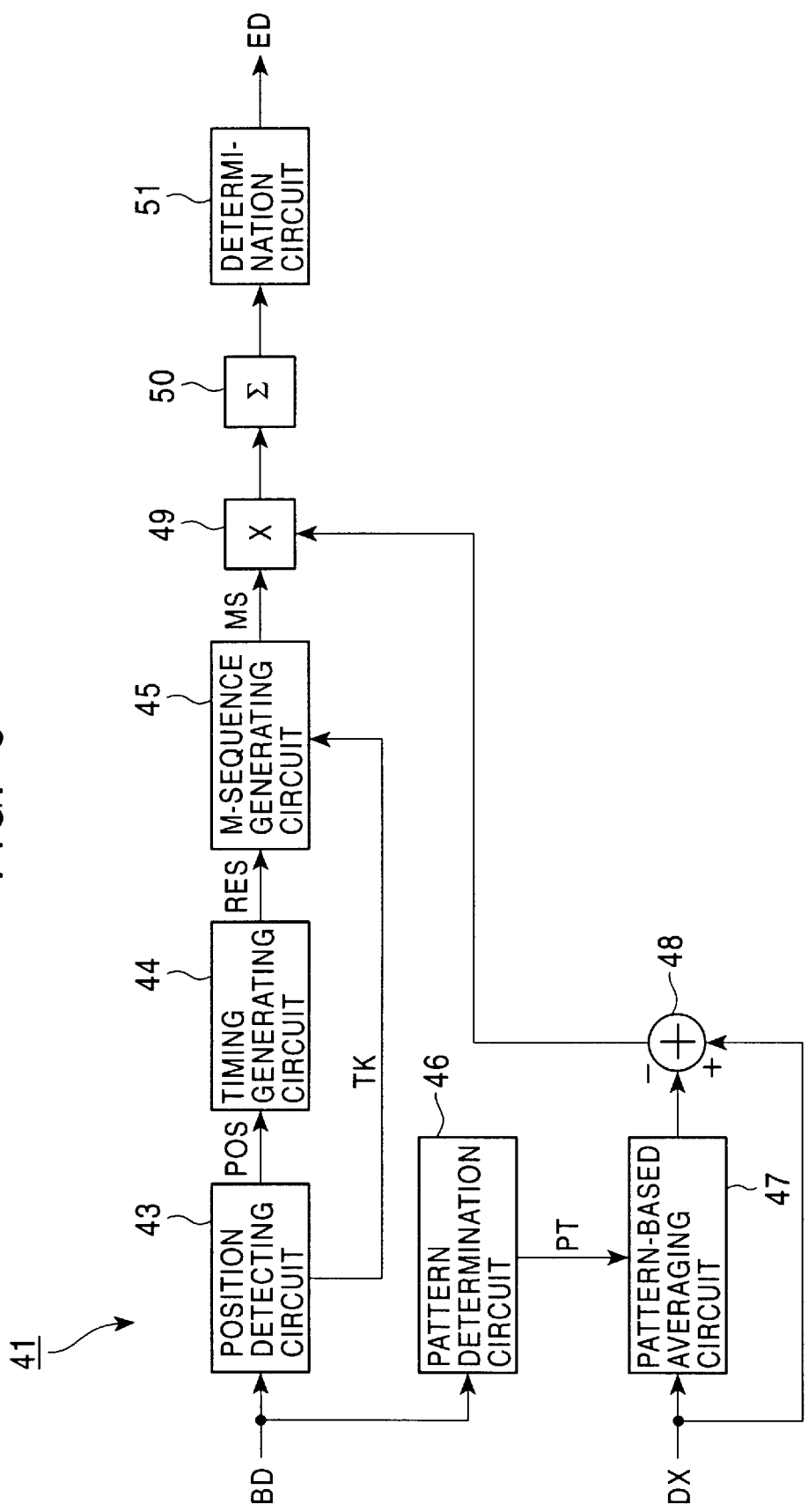
FIG. 8 is a block diagram of a second decoding circuit in the optical disk apparatus shown in FIG. 7.

FIG. 8 is a block diagram of the second decoding circuit 41. In the second decoding circuit 41, buffers for timing adjustment are provided between the blocks as required. In the second decoding circuit 41, a position detecting circuit 43 is constructed identically to the position detecting circuit 9 of the copyright information recording apparatus 1, and outputs the same position information TK and POS as at the time of recording.

A timing generating circuit 44 and an M-sequence generating circuit 45 are constructed identically to the timing generating circuit 18 and the M-sequence generating circuit 19 of the copyright information recording apparatus 1, and plays back the same M-sequence MS as at the time of recording.

A pattern determination circuit 46 determines the signal level of the binary signal BD with reference to the channel clock CK, and with regard to a predetermined range of irradiation of laser beams, determines the lengths of the marks and spaces formed on the optical disk 2 according to the mask signal EX, thereby outputting a determination result PT.

A pattern-based averaging circuit 47 generates, based on the determination result PT from the pattern determination circuit 46, a determination reference level required for playback of the copyright protection information ED. In this embodiment, at the time of recording, the copyright protection information ED is modulated using the M-sequence MS to generate the modulated signal PM in which logic "1" and logic "0" appear with the same probability, and the copyright protection information ED is recorded in the form of the modulated signal PM; thus, in the digital playback signal DX which is obtained by sampling the playback signal HF with reference to the channel clock CK, the effects of logic "1" and logic "0" on the modulated signal PM appear with a substantially equal probability.

Thus, the pattern-based averaging circuit 47 averages the signal level of the digital playback signal DX for each pattern, thereby generating a reference signal level for each pattern of mark sequence, in which the effects of logic "1" and logic "0" on the modulated signal PM are substantially averaged. Furthermore, the pattern-based averaging circuit 47 outputs the reference signal level according to the determination result PT from the pattern determination circuit 46.

A subtraction circuit 48 subtracts the reference signal level output from the pattern-based averaging circuit 47 from the digital playback signal DX, thereby outputting a subtraction result. The subtraction circuit 48 thus eliminates the effect of mask signal EX on the digital playback signal DX.

Thus, the pattern-based averaging circuit 47 and the subtraction circuit 48, together with an operation circuit 49, an integration circuit 50Σ, and a determination circuit 51 to be described later, based on the determination result PT from the pattern determination circuit 46, eliminates the effect of the mark sequences on the digital playback signal DX and determines the signal level of the digital playback signal DX, thus constituting copyright information decoding means for decoding information regarding copyright recorded on the optical disk 2.

An operation circuit 49 operates the M-sequence MS and the output data from the subtraction circuit 48. More specifically, the operation circuit outputs the value of the output data from the subtraction circuit 48 when the M-sequence MS is logic "0" while outputting the inverse of the output data from the subtraction circuit 48 when the M-sequence MS is logic "1".

An integration circuit 50, which is implemented, for example, by a 24-bit digital adder, integrates the output data from the operation circuit 49 at a cycle corresponding to the recording of one bit of the copyright protection information ED.

A determination circuit 51 determines the binary level of the integration results from the integration circuit 50 with reference to a predetermined threshold value, thereby sequentially decoding each of the bits of the copyright protection information ED.

In the optical disk apparatus 61, when the optical disk 2 is mounted, a controller which is not shown controls the overall operation so as to access the copyright protection information recording area ARED in addition to the lead-in area, whereby the second decoding circuit 41 decodes the copyright protection information ED. Furthermore, in the recording and playback systems, encryption and decryption processes are performed using the copyright protection information ED as described above, inhibiting accesses in so-called pirate editions.

(2) Operation of the Embodiment

In the manufacturing process of the optical disk 2 according to the embodiment, the copyright information recording apparatus 1, shown in FIG. 1, records the copyright protection information ED, unique to the optical disk 2, in the inner area ARED of the optical disk 2, shown in FIG. 2.

With regard to the recording, the copyright information recording apparatus 1 receives the copyright protection information ED unique to the optical disk 2 from the information registration center 4. The copyright protection information ED is recorded in the inner area of the optical disk 2, i.e., the copyright protection information recording area ARED, shown in FIG. 2, and the mask signal EX is recorded overlapping the copyright protection information ED, whereby the level of recording of the copyright protection information ED is deteriorated. With regard to the copyright protection information ED with the mask signal EX recorded overlappingly, the level of recording is deteriorated so that the SN ratio in the playback signal is deteriorated by on the order of 30 dB, inhibiting playback by an ordinary playback system; however it is still allowed to be observed as variations of the signal level in the playback signal. The copyright protection information ED can thus be recorded on the optical disk 2 so as to inhibit detection thereof.

The copyright protection information ED is recorded on the optical disk 2 at a cycle sufficiently longer than the channel clock CK so that each bit will be allocated to an area having a length on the order of 1 mm in the circumferential direction of the optical disk 2. Thus, according to this embodiment, even if the level of recording is significantly deteriorated, the copyright protection information ED can be accurately played back based on each of the bits which is recorded over a relatively long length on the optical disk 2.

Furthermore, the copyright protection information ED is scrambled so as to further inhibit detection thereof. More specifically, the mask signal EX is generated by modulating predetermined information; thus, in the playback signal of the copyright protection information ED, shown in FIGS. 5 and 6, the variations of signal level, which are observed as very small variations due to the deterioration of recording level, are disturbed by the variations of the signal level of the mask signal EX, which are much larger, inhibiting detection of the copyright protection information ED by waveform observation using an oscilloscope, etc. or determination simply with reference to a fixed signal level.

Furthermore, the copyright protection information ED is scrambled by the M-sequence MS which is a binary sequence, shown in FIGS. 3 and 4, with reference to the headers provided in the copyright protection information recording area ARED, shown in FIG. 2. Thus, even if a relatively long distance on the optical disk 2 is allocated to each bit, the copyright protection information ED is observed as a signal waveform similar to that of a noise when it is played back, further inhibiting detection thereof. In particular, by scrambling the copyright protection information ED using the M-sequence MS in which logic "1" and logic "0" appear with the same probability, the copyright protection information ED is observed as a white noise when it is played back, further inhibiting detection of the copyright protection information ED.

Furthermore, by generating the M-sequence MS on a track by track basis, the copyright protection information ED is observed as a noise, further inhibiting detection thereof.

The copyright protection information ED, which is recorded with a deteriorated recording level, inhibits detection thereof, and even if it is detected, inhibits copying thereof. More specifically, the copyright protection information ED is detected as slight variations in the signal level of the playback signal, and is recorded while being scrambled using the mask signal EX and the M-sequence MS, inhibiting copying thereof. Accordingly, the optical disk 2 serves to prohibit creation of pirate editions and to thereby effectively protect the benefits of the copyright holder.

When the optical disk 2 is mounted on the optical disk apparatus 61, shown in FIG. 7, the copyright protection information ED, together with information on the lead-in area, is played back, and audio data, etc. is encrypted using the copyright protection information ED and recorded on the optical disk 2, or audio data, etc. recorded on the optical disk 2 is decrypted using the copyright protection information ED. Thus, for example, in case of an optical disk on which the copyright protection information ED is not recorded, decryption of the audio data, or encryption of the audio data allowing decryption, is inhibited. The optical disk on which the copyright protection information ED is not recorded can be assumed as products distributed via an illegitimate route, such as pirate editions. This embodiment significantly depreciates the pirate editions, thereby protecting the benefits of the copyright holder.

When the copyright protection information ED is played back, in the optical disk apparatus 61, the playback signal HF whose signal level changes according to the mark sequences formed on the optical disk 2 is converted to the digital playback signal DX in the analog-digital conversion circuit 40, and the digital playback signal DX is processed in the second decoding circuit 41, whereby the copyright protection information ED is played back.

More specifically, in the optical disk apparatus 61 shown in FIG. 7, the pattern determination circuit 46 detects patterns of mark sequences in a predetermined area with regard to the positions irradiated by laser beams, and the pattern-based averaging circuit 47 averages the signal level of the digital playback signal DX for each of the patterns according to the detection result. Furthermore, the subtraction circuit 48 subtracts the averaged signal level from the digital playback signal DX in accordance with the pattern determination result PT, eliminating the effects of the mask signal EX. That is, in the digital playback signal DX, the effects of the changes in the signal level in accordance with the mark sequences which are overlappingly recorded are eliminated.

In the optical disk apparatus 61, the digital playback signal DX, in which the changes in the signal level in accordance with the mark sequences are eliminated, is descrambled by being operated with the same M-sequence MS as at the time of recording. The subsequent integration circuit 50 integrates the operation results, eliminating the effects of noise in the copyright protection information ED which is observed as slight variations in the signal level, and the subsequent determination circuit 51 determines the binary level of the copyright protection information ED. Accordingly, in the optical disk apparatus 61, the copyright protection information ED, which is recorded at a recording level deteriorated by the mask signal EX, is allowed to be played back accurately, thus serving to effectively protect the benefits of the copyright holder.

(3) Advantages of the Embodiment

In accordance with the above, by irradiation of laser beams on the recording of information regarding copyright, i.e., the copyright protection information ED, which deteriorates the level of recording of the information regarding copyright, the information regarding copyright can be recorded so as to inhibit detection thereof. Accordingly, the benefits of the copyright holder can be protected more effectively compared with before.

Furthermore, by recording predetermined information, at a lower intensity of laser beams, over the recording of the information regarding copyright so as to deteriorate the recording level of the information regarding copyright, the degree of deterioration of the recording of the information regarding copyright can be adjusted by setting of the intensity level of laser beams, allowing accurate playback of the information regarding copyright which has thus been recorded.

Furthermore, by recording each bit of the information regarding copyright over a relatively long distance in the circumferential direction of an optical disk, i.e., by allocating to each bit a sufficiently long distance relative to the channel clock, the information regarding copyright, which has thus been recorded, can be accurately played back.

In particular, by allocating to each bit of the information regarding copyright a length of 1 mm or longer in the circumferential direction of the optical disk, the information regarding copyright can be played back practically.

Furthermore, by scrambling each bit of the information regarding copyright using a predetermined binary sequence, the information regarding copyright can be recorded so as to inhibit detection thereof. Accordingly, the benefits of the copyright holder can be protected even more effectively.

Meanwhile, in the playback system, the variations in the signal level of the playback signal due to the mark sequences are eliminated based on the patterns of mark sequences formed on the optical disk, and the signal level is determined, whereby the information regarding copyright is played back. Accordingly, the information regarding copyright, which is recorded on the optical disk, can be accurately played back.

In particular, by descrambling the information regarding copyright using the same binary sequence as at the time of recording, and integrating the descrambled information regarding copyright, thereby decoding the information regarding copyright, the information regarding copyright, which has been recorded so as to inhibit detection thereof, can be accurately played back.

(4) Other Embodiments

Although the mask signal is generated by modulating predetermined information in the above-described embodiment, the present invention is not limited thereto, and the mask signal may be generated from various signals.

Furthermore, although the level of recording of the information regarding copyright is deteriorated by recording the mask signal overlappingly in the above-described embodiment, the present invention is not limited thereto, and the level of recording may be deteriorated by an erasing process, for example, by irradiation of laser beams at a predetermined intensity level.

Furthermore, although the information regarding copyright is scrambled by the recording of the mask signal, and in addition, by the operation with the M-sequence MS in the above-described embodiment, the present invention is not limited thereto, and the processes may be omitted as long as the information regarding copyright can be practically kept secret.

Furthermore, although a length of 1 mm or longer is allocated to each bit of the information regarding copyright in the above-described embodiment, the present invention is not limited thereto, and the length to be allocated to each bit may be set as desired.

Furthermore, although the information regarding copyright is recorded in the form of serial data in the above-described embodiment, the present invention is not limited thereto, and for example, the information regarding copyright may be recorded in the form of a cyclic repetition of a plurality of bits of the information regarding copyright.

Furthermore, although the optical disk is an optical disk of the phase-change type, which allows recording, in the above-described embodiment, the present invention is not limited thereto, and the optical disk may be a magneto-optical disk which allows recording and playback, or may be an optical disk for read-only.

Furthermore, although access to the optical disk is controlled by an encryption processing using the information regarding copyright in the above-described embodiment, the present invention is not limited thereto, and the access to the optical disk may be controlled by stopping the operations of the recording and playback systems, or may be controlled by stopping output of the playback signal.

Furthermore, although the optical disk employs CAV (Constant Angular Velocity) or ZCLV (Zone Constant Linear Velocity) in the above-described embodiment, the present invention is not limited thereto, and the optical disk may employ CLV (Constant Linear Velocity) or ZCAV (Zone Constant Angular Velocity).

Furthermore, although the information regarding copyright includes information unique to each optical disk in the above-described embodiment, the present invention is not limited thereto, and for example, when the optical disk is sold with audio data, etc. recorded thereon, the information regarding copyright may include information unique to the artist.

Furthermore, although the information regarding copyright is recorded in a predetermined area on the inner side of the optical disk in the above-described embodiment, the present invention is not limited thereto, and the information regarding copyright may be recorded in various areas, for example, in a plurality of areas separately.

What is claimed is:

1. An optical disk apparatus comprising:
   recording means for recording information regarding copyright by irradiating an optical disk with laser beams; and
   controlling means for controlling said recording means so that, after said information regarding copyright has been recorded in a predetermined area on said optical disk, the level of recording of said information regarding copyright is deteriorated by irradiating said predetermined area with the laser beams.

2. An optical disk apparatus according to claim 1, wherein said controlling means controls said recording means so as to record predetermined information overlapping the recording of said information regarding copyright.

3. An optical disk apparatus according to claim 2, wherein said controlling means controls said recording means so as to record the predetermined information overlappingly at an intensity level of the laser beams lower than that for the recording of said information regarding copyright.

4. An optical disk apparatus according to claim 1, wherein said optical disk is an optical disk of the phase-change type.

5. An optical disk apparatus according to claim 1, wherein said optical disk is a magneto-optical disk.

6. An optical disk apparatus according to claim 1, wherein said controlling means records each bit of said information regarding copyright over a relatively long distance in the circumferential direction of said optical disk.

7. An optical disk apparatus according to claim 1, wherein said controlling means allocates a length of 1 mm or longer in the circumferential direction of said optical disk to each bit of said information regarding copyright.

8. An optical disk apparatus according to claim 1, wherein said controlling means records said information regarding copyright on said optical disk while scrambling each bit of said information regarding copyright using a predetermined binary sequence.

9. A method of recording information regarding copyright by irradiating an optical disk with laser beams, said method comprising the steps of:
   recording said information regarding copyright in a predetermined area of said optical disk, and
   deteriorating the level of recording of said information regarding copyright by irradiating said predetermined area with laser beams.

10. A method according to claim 9, wherein said deteriorating step records predetermined information overlapping the recording of said information regarding copyright.

11. An optical disk apparatus which irradiates an optical disk with laser beams so as to play back data recorded on said optical disk, said optical disk apparatus comprising:
    playback signal output means for outputting, by irradiating said optical disk with the laser beams and detecting light returning therefrom, a playback signal whose signal level changes according to mark sequences formed on said optical disk;
    pattern determination means for determining a pattern of the mark sequences formed on said optical disk;
    decoding means for eliminating variations of the signal level of said playback signal due to said mark sequences based on a determination result of said pattern determination means and determining the signal level, and for playing back information regarding copyright recorded on said optical disk; and
    controlling means for controlling access to said optical disk using said information regarding copyright.

12. An optical disk apparatus according to claim 11, wherein said decoding means comprises:
    binary sequence generating means for generating a predetermined binary sequence with reference to said playback signal;
    subtraction means for subtracting the variations of the signal level of said playback signal due to said mark sequences based on the determination result of said pattern determination means;
    operation means for operating the subtraction result of said subtraction means and said binary sequence; and integration means for integrating the operation result of said operation means at a predetermined cycle and outputting said information regarding copyright.

13. An optical disk apparatus according to claim 11, wherein said controlling means controls access to said optical disk by descrambling data played back from said optical disk, using said information regarding copyright.

14. An optical disk apparatus according to claim 11, wherein said controlling means encrypts predetermined data using said information regarding copyright, and records the encrypted data on said optical disk, while controlling access to said optical disk by descrambling data played back from said optical disk, using said information regarding copyright.

15. An optical disk comprising an information recording surface, wherein information regarding copyright is recorded in a predetermined area of said information recording surface, and the level of recording of said information regarding copyright is deteriorated by irradiating said predetermined area with laser beams.

16. An optical disk according to claim 15, wherein predetermined information is recorded overlapping the recording of said information regarding copyright.

17. An optical disk according to claim 15, said information regarding copyright is recorded with each bit thereof scrambled using a predetermined binary sequence.

18. An optical disk according to claim 15, wherein said information regarding copyright is recorded with a length of 1 mm or longer in the circumferential direction of said optical disk allocated to each bit of said information regarding copyright.

* * * * *